2,683,867

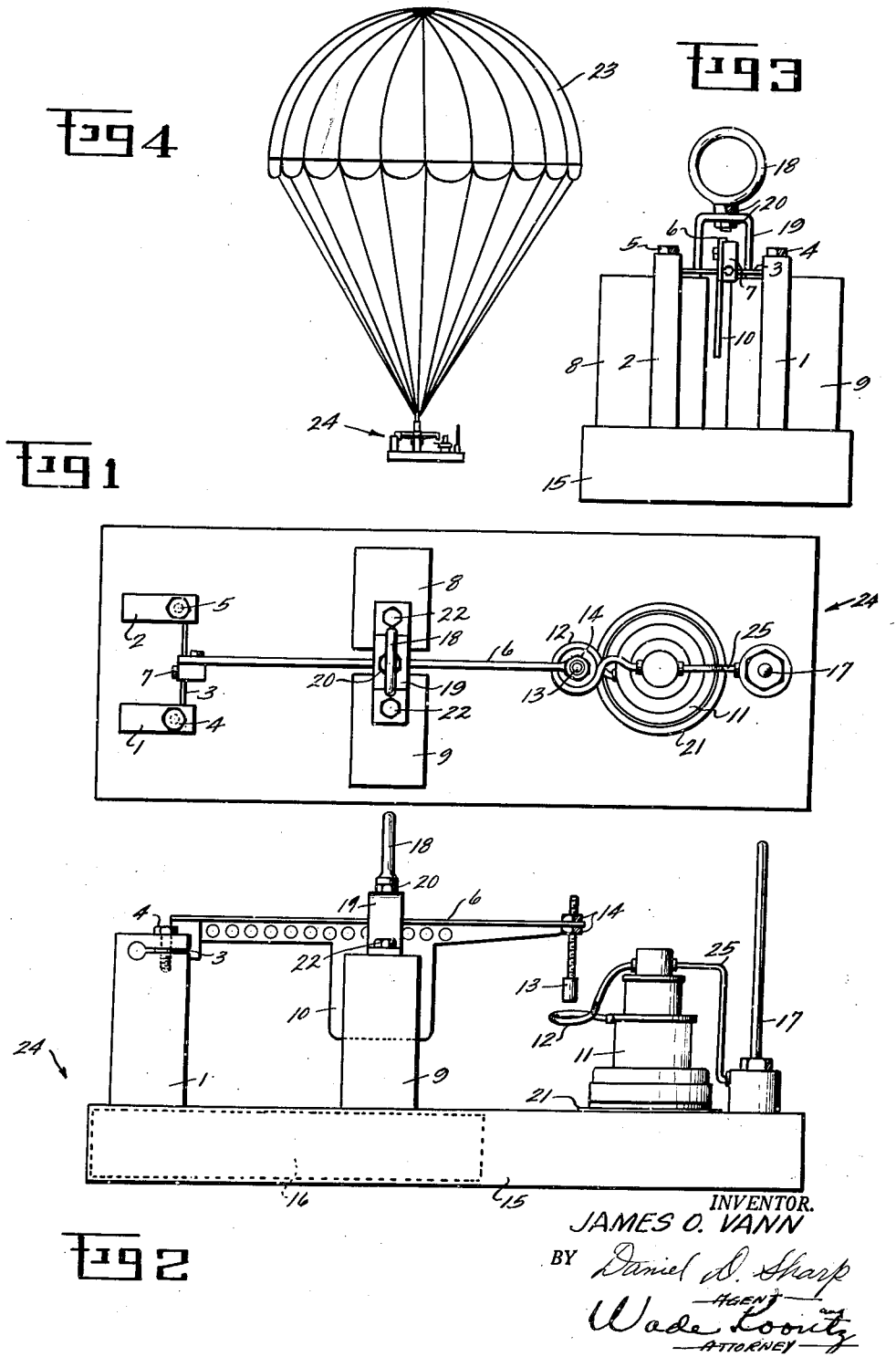
July 13, 1954 — J. O. VANN — 2,683,867
PARACHUTED RADIO SEISMIC TRANSDUCER
Filed June 11, 1951
INVENTOR.
JAMES O. VANN Patented July 13, 1954

UNITED STATES PATENT OFFICE 2,683,867

PARACHUTED RADIO SEISMIC TRANSDUCER

James O. Vann, Belmont, Mass.

Application June 11, 1951, Serial No. 231,018

4 Claims. (Cl. 340—17)

(Granted under Title 35, U. S. Code (1952), sec. 266)

The invention described herein may be manufactured and used by or for the Government for governmental purposes without payment to me of any royalty thereon.

This invention relates to a radio-telemetering seismic transducer capable of being dropped from aircraft by parachute and which is extremely sensitive to the measurement of any kind of vibration occurrences while at the same time is capable of withstanding the shock incident to parachute opening and landing.

The invention may be used to investigate seismic waves propagated in ice sheets in polar areas to determine the thickness of sea or lake ice for aircraft landings or other military operations on ice. It may also be used as a homing device for rescue aircraft to locate crashed aircraft or to determine mud depth for soil trafficability. The device according to this invention is designed to be dropped to the earth which is to be investigated from aircraft by means of a parachute.

An object of this invention is to provide a new and easily adjustable type of seismic transducer which not only is inexpensive and simple of construction but also able to withstand parachute opening shock and landing shock so as not to be be liable to serious damage. An additional object of this invention is to afford a means of measuring ground vibrations by a radio wave link, thus permitting measurements to be made at geographical areas where ground crews are not feasible.

Another object of this invention is to provide a new and improved seismic transducer suitable for distribution from an airplane for location in a particular terrain and capable of transmitting signals which are a function of said particular terrain.

Still another object of this invention is to provide a radiotelemetering seismic transducer that is extremely sensitive to the measurement of any type of vibration occurrences.

A further object of the subject invention is to provide a seismic transducer capable of changing incoming vibrations into a frequency change by the use of a suspended powdered iron core to change the inductance of a high frequency oscillator tank coil.

In the drawings:

Figure 1 is a plan view of the seismic transducer embodying this invention.

Figure 2 is a view in elevation of Figure 1.

Figure 3 is a left end view of Figure 1.

Figure 4 is a pictorial representation of the seismic transducer supported by a parachute.

Referring to the drawings wherein like numerals designate like parts, the seismic transducer unit 24 consists of a high frequency oscillator tube 11, shown here as a conventional lighthouse tube, having a lumped inductance tank coil 12, and a powdered iron core 13 mounted on a suspended seismic arm 6, as clearly shown in Figure 2. The oscillator tube 11, shown here as a conventional lighthouse triode, but which may be any type oscillator having a frequency operating range corresponding to the range desired, is plugged into a conventional tube socket 21 mounted in base 15. A confentional power supply 16 for energization of oscillator tube 11 is also mounted at some convenient location in the base 15, consistent with requirements for balance and proximity to tube 11. The power supply may, of course, be mounted on top of base 15, if desired. Base 15 may be substantially solid except for recesses for placement of power supply, tube socket and the necessary connections. Moreover, the base may be counterweighted in the usual manner to insure proper balance while the seismic transducer is suspended by parachute and after it strikes the earth.

The oscillator tank coil 12 is rigidly attached to oscillator tube 11 which, in turn, is firmly mounted in the tube socket attached to base 15. The output circuit of oscillator tube 11 is coupled to an antenna 17 by means of a lead 25

Two metal posts 1 and 2 hold a torsion wire 3, which may be a length of music wire, between clamps 4 and 5 on said metal posts 1 and 2, respectively. An aluminum seismic arm 6 is suspended in a horizontal position by a clamp 7 on torsion wire 3. Magnets 8 and 9 serve as magnetic damping means for the seismic arm 6 by producing eddy currents in the portion 10 of arm 6. These magnets are fixedly mounted to the base 15. The oscillator tank coil 12 is located below and concentric with the iron core 13, which is mounted at the extreme end of seismic arm 6 by means of lock nuts, as clearly shown in Figure 2.

As shown in Figure 3, a supporting means for the seismic transducer comprises an eyebolt 18, which in turn is fastened securely to a bracket 19 constructed of some non-magnetic material, such as brass, by means of two lock nuts 20. The bracket may be mounted on magnets 8, 9 by means of two machine screws 22 screwed into two tapped holes in the aforesaid magnets. The details of the supporting means do not, in themselves, constitute an inventive feature and other types of mounting means may be used, if desired.

As shown in Figure 4, the seismic transducer unit 24 is suspended from a parachute 23 dropped from an airplane. The parachute is attached to eyebolt 18.

In operation, when vibrations of the earth occur, the tank coil 12 of oscillator 11 moves with the vibrations. The inertia of the suspended seismic arm 6 tends to keep it motionless. The arrival of vibration, therefore, causes relative motion between the oscillator tank coil 12 and the powdered iron core 13 mounted on arm 6. This relative motion of the iron core and oscillator tank coil changes the inductance of the coil, thereby changing the frequency of the oscillator. The magnitude and rate of the frequency change is dependent on the magnitude and rate of the incoming vibrations. It was found that, in using a 70 megacycle oscillator, a relative motion of one-millionth of an inch between the iron core and the oscillator tank coil caused a frequency change of 50 cycles per second.

The seismic vibration frequency modulates oscillator 11; that is to say, a frequency change representing the incoming vibrations is produced in the oscillator. The energy is radiated into space by means of antenna 17 which may be of any type of antenna suitable for the range of frequencies used.

An aircraft having a proper receiver can receive, reproduce and record the seismic vibrations while in flight.

I claim:

1. A seismic transducer for converting earth vibrations into a frequency modulated electromagnetic wave, said transducer being a unitary structure suitable for dropping by parachute and comprising: a supporting structure adapted to contact the earth and to receive said vibrations, a radio transmitter rigidly attached to said supporting structure and having a coil the inductance of which determines the frequency of the transmitted wave, an inertia device freely mounted on said supporting structure, and a core of magnetic material supported by said inertia device in the magnetic field of said coil.

2. A seismic transducer for converting earth vibrations into a frequency modulated electromagnetic wave, said transducer being a unitary structure suitable for dropping by parachute and comprising: a base member adapted to contact the earth and to receive said vibrations, a radio transmitter rigidly attached to said base member and having a coil the inductance of which determines the frequency of the transmitted wave, a seismic arm supported at one end by a torsion wire extending between two posts rigidly attached to said base, and a core of magnetic material supported by the other end of said arm and positioned in the magnetic field of said coil.

3. A seismic transducer for converting earth vibrations to a frequency modulated electromagnetic wave, said transducer being a unitary structure suitable for dropping by parachute and comprising: a base member adapted to contact the earth and to receive said vibrations, a radio transmitter rigidly attached to said base member and having a coil the inductance of which determines the frequency of the transmitted wave, a seismic arm supported at one end by a torsion wire extending between two posts rigidly attached to said base, a core of magnetic material supported by the other end of said arm and positioned in the magnetic field of said coil, and a magnetic damping means for said arm, said damping means comprising a metallic plate attached to said arm and means attached to said base for passing a constant magnetic field through said plate.

4. A seismic transducer for converting earth vibrations into a representatively frequency modulated electrical signal, said transducer comprising: a supporting structure adapted to contact the earth and to receive said vibrations, an oscillator rigidly attached to said supporting structure and having a coil the inductance of which determines the oscillator frequency, an inertia device freely mounted on said supporting structure, and a core of magnetic material supported by said inertia device in the magnetic field of said coil.

References Cited in the file of this patent

UNITED STATES PATENTS

| Number | Name | Date |
| --- | --- | --- |
| 1,784,415 | Benioff | Dec. 9, 1930 |
| 1,796,150 | Hamer | Mar. 10, 1931 |
| 2,265,513 | Burg | Dec. 9, 1941 |
| 2,272,984 | Ritzmann | Feb. 10, 1942 |
| 2,288,838 | Pike | July 7, 1942 |
| 2,371,040 | Fisher | Mar. 6, 1945 |
| 2,479,772 | Peterson | Aug. 23, 1949 |
| 2,583,941 | Gordon | Jan. 29, 1952 |
| 2,593,339 | Ostermann | Apr. 15, 1952 |